United States Patent [19]

Cianciolo et al.

[11] 4,369,643

[45] Jan. 25, 1983

[54] CLOSURE WITH SMOOTH EDGE

[75] Inventors: Cosmo J. Cianciolo, Wolcott; John R. Snyder, Oakville, both of Conn.; Roderick V. King, Girard, Pa.

[73] Assignee: Ethyl Products Company, Richmond, Va.

[21] Appl. No.: 211,319

[22] Filed: Nov. 28, 1980

[51] Int. Cl.³ .................... B21C 37/30; B24B 39/00
[52] U.S. Cl. ........................................ 72/75; 72/126; 72/299; 29/90 R
[58] Field of Search ............... 72/67, 70, 75, 112, 72/84, 125, 126, 348, 199, 214, 215, 76, 177, 224; 409/297; 215/215-218, 333, 334, 200; 29/90 R, 90 A, 1.32; 51/170 T, 170 TM; 408/227

[56] References Cited

U.S. PATENT DOCUMENTS

| | | | |
|---|---|---|---|
| 872,733 | 10/1907 | Jones | 72/75 |
| 921,739 | 5/1909 | Rieske | 72/75 |
| 1,058,856 | 4/1913 | Gibbs | 72/75 |
| 1,842,571 | 1/1932 | Sebell | 72/126 |
| 1,907,038 | 5/1933 | Burns | 72/126 X |
| 2,133,298 | 10/1938 | Kaufman | 220/288 |
| 2,233,105 | 2/1941 | McCombs | 220/256 |
| 2,239,696 | 4/1941 | Bohm | 72/70 |
| 2,456,682 | 12/1948 | Dapprich | 72/75 |
| 2,645,000 | 7/1953 | Finch | 82/25 X |
| 2,953,047 | 9/1960 | Stillwagon, Jr. | 72/75 |
| 3,185,333 | 5/1965 | Sharp | 215/217 |
| 3,248,774 | 5/1966 | Kraus | 29/1.32 X |
| 3,402,586 | 9/1968 | Müller | 72/199 |
| 3,478,558 | 11/1969 | Hoffman et al. | 72/199 |
| 3,538,874 | 11/1970 | Sawert | 72/84 |
| 3,866,452 | 2/1975 | Neilsen | 72/199 |
| 4,011,962 | 3/1977 | Favell | 215/334 |

FOREIGN PATENT DOCUMENTS 507567  7/1957  Italy .................................. 72/75

Primary Examiner—Lowell A. Larson
Attorney, Agent, or Firm—Donald L. Johnson; John F. Sieberth

[57] ABSTRACT

A metal cap or closure having a smooth, rounded edge. The smooth, rounded edge is formed by contacting the rough edge of the cap or closure with a plurality of moving metal spheres. The apparatus for forming the smooth, rounded edge includes a plate in which the spheres are rotatably mounted and a holder for holding the closure over the spheres so that the edge of the closure contacts the rotating spheres.

4 Claims, 11 Drawing Figures

U.S. Patent    Jan. 25, 1983    Sheet 1 of 3    4,369,643
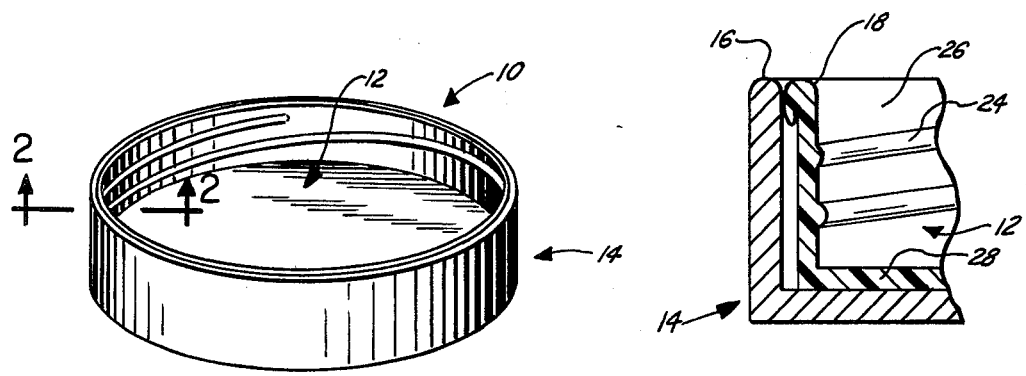
FIG. 1.
FIG. 2.
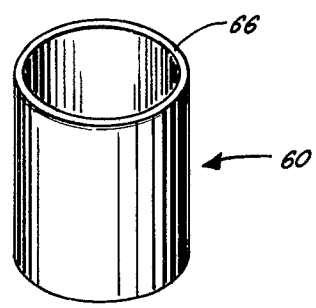
FIG. 3.

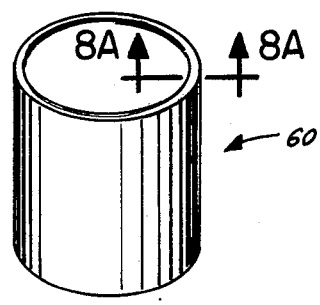
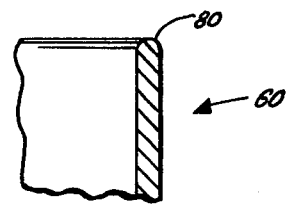
FIG. 8.  FIG. 8A.
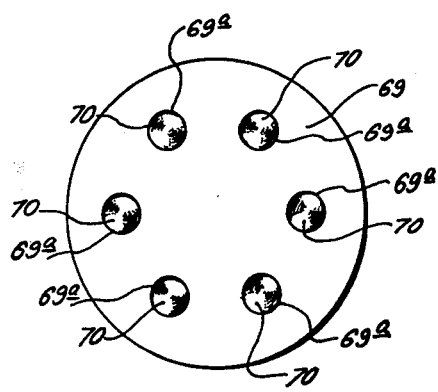
FIG. 7.

CLOSURE WITH SMOOTH EDGE

BACKGROUND OF THE INVENTION

In the highly competitive cosmetic industry proper packaging of the product is very important. Industry desires a package which is handsome and elegant to convey to the consumer the sense of elegance and luxuriousness associated with the product. Generally speaking, the cosmetic product is packaged in a brightly colored container having a screw top closure. To overcome the rather stark appearance of the conventional, continuous thread closures, the industry has found it desirable on some dispensers to utilize two-piece closures. These two-piece closures usually consist of an inner cap which has a helical thread about the inside of the wall of the side wall of the inner cap and an outer cap which surrounds the inner cap and which has eye pleasing characteristics. The outer cap is most normally metal so that a metallic gold or silver color can be used to give the desired impression.

In some cosmetic dispensers, a smooth walled one-piece closure with no threads is utilized. For example, some perfume dispensers have a one-piece metal closure which is force-fitted on the top of the perfume dispenser to cover the dispensing button.

Since the conventional punch and die process is used to form the cap, a rough unfinished outer edge on the side wall of the cap is present. Besides the problems of preventing cuts to the hand from such an edge, there are closure-container assembly problems associated with such a cap. When assembling the container and closure, the closure may be put into a vibrating hopper or unscrambler which causes the closures or caps to vibrate and therefore movably contact one another so that the rough edges of the cap contact the outer wall surfaces of the other caps or closures. Such contact frequently causes scarring of the closure finish. Such scarring is obviously undesirable as the esthetically pleasing appearance is ruined. Another disadvantage of sharp-edged closures is that the sharp edge will often times cut into the container should the closure be screwed tightly onto the container.

Accordingly, it is an object of this invention to provide a closure or cap which does not have any sharp edges which would cut the users' hands or cause scarring during assembly, or damage to the container on which it is used.

THE INVENTION

In accordance with the present invention there is provided a metal cap or closure having a smooth, rounded edge. The smooth, rounded edge is formed by contacting the rough edge of the cap or closure with a plurality of moving metal spheres. The apparatus for forming the smooth, rounded edge includes a plate in which the spheres are rotatably mounted and a means for holding the closure over the spheres so that the edge of the closure contacts the rotating spheres.

The closure formed in accordance with the present invention is highly versatile. The closure is compatible with the different types of inner caps where inner caps need to be utilized. The closure of the present invention has a smooth, rounded edge which does not have any sharp edges to easily cut the users' hands, cause scarring during assembly, or damage the container on which it is used.

These and other features of the invention contributing satisfaction in use and economy in manufacture may be more fully understood from the following description of a preferred embodiment of the invention when taken in connection with the accompanying drawings in which identical numerals refer to identical parts.

BRIEF DESCRIPTION OF THE DRAWINGS

FIG. 1 is a perspective view of a closure of the invention;

FIG. 2 is a sectional view taken along lines 2—2 of FIG. 1;

FIG. 3 is a perspective view of another closure of the invention;

FIG. 7 is a top plan view taken along lines 7—7 of FIG. 6;

FIG. 8 is a perspective view of the closure of the invention after the edge has been rounded; and, FIG. 8A is a cross-sectional view taken along lines 8A—8A of FIG. 8;

FIG. 9 is an elevational view, partially in section, of an alternate form of the apparatus for producing a rounded edge on the closure; and FIG. 10 is a top view of FIG. 9 taken along the lines 10—10.

DESCRIPTION OF THE PREFERRED EMBODIMENTS

Figure 6:
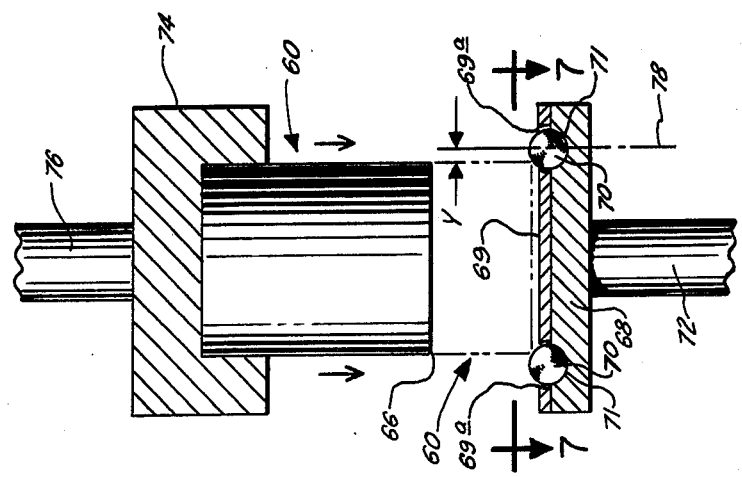
FIG. 6 is a side elevational view of the closure of FIG. 3 positioned over the edge-rounding apparatus.

Referring now to FIGS. 1 and 2, it can be seen that a two-piece closure of this invention, generally designated by the numeral 10, has an inner cap, generally designated by the numeral 12, which is nested within an outer cap or overcap, generally designated by the numeral 14. Inner cap 12 stays in rigid contact with outer cap 14, which contact is achieved by force-fitting inner cap 12 within outer cap 14. As is shown in FIG. 2, the particular embodiment depicted has edge 18 of inner cap 12 and edge 16 of outer 14 being approximately the same height. If desired, however, edge 18 of inner cap 12 may be in a somewhat lower position. For example, inner cap 12 may be substantially shorter in height than outer cap 14, a combination which is highly effective on long neck containers.

Cap 14 is a metal cap while inner cap 12 is generally, for economic reasons, also metal. Inner cap 12, however, may be of any suitable material as, for example, plastic. A plastic cap can be attached to the outer cap 14 by simply gluing the two together.

As seen in FIG. 2, inner cap 12 is a conventional, continuous thread metal cap having continuous helical threads 24 which are formed on the inside of inner cap side wall 26. Inner cap side wall 26 is attached to inner cap top wall 28 at one end and terminates at the other end into edge 18. Edge 18 is a rounded edge and is formed simply by turning back a portion of inner cap side wall 26. The diameter of inner cap 12 including the turned back portion of inner cap side wall 26 should be such that it will provide a force fit within outer cap 14 to insure rigid connection between the two caps.

In an additional embodiment of the present invention, as shown in FIG. 3, the closure 60 has no inner cap therein. The cap is formed of metal and has particular utility on bottles such as perfume bottles where the cap is slipped over the top to prevent the push-button actuator from being depressed.

It should be pointed out that the particular outer cap shown in FIG. 1 is one in which the inner cap would be much shorter than the outer cap and would be nested up in the outer cap near the outer cap top wall. Such a closure would be particularly suitable for utilization on long neck containers where it is desired to have a closure covering a long neck without having the long neck completely threaded from top to bottom. The formation of cap 14 or cap 60 can be achieved by utilization of conventional equipment. FIGS. 4, 4A, 5, and 5A depict two stages in the formation of cap 60.

Figure 5:
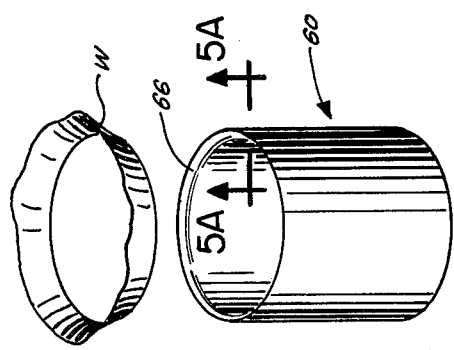
FIG. 5 is a perspective view showing the cap of the present invention after the top portion has been removed.
Figure 5A:
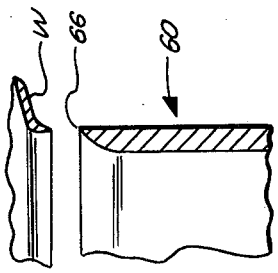
FIG. 5A is a sectional view taken along lines 5A—5A of FIG. 5.
Figure 4:
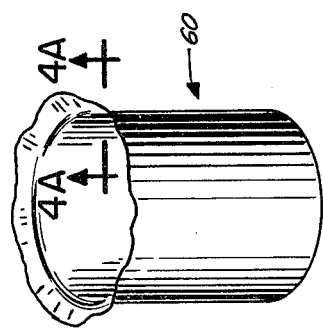
FIG. 4 is a perspective view of the cap of the invention after it has been through a conventional blanking and cupping operation.
Figure 4A:
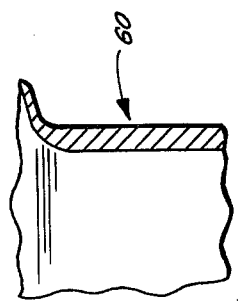
FIG. 4A is a sectional view taken along lines 4A-4A of FIG. 4.

FIGS. 4, 4A, 5, and 5A show cap 60 after it has been through a conventional blanking and cupping operation. Waste material W is removed from the cap as shown in FIG. 5 while at the same time terminal end 66 is also formed. The terminal end 66 corresponds to terminal end 16 shown in FIGS. 1 and 2. Removal of waste W and formation of terminal end 66 is achieved by utilization of a pinch trim which is well-known in the art.

In FIGS. 6 and 7 is shown the manner in which the edge of a closure is rounded in accordance with the present invention, and the apparatus utilized. As can be seen in those figures, a plate 68 contains a series of spheres 70 therein. Spheres 70 are preferably made from a hard metal such as steel, or even more preferably, carbides such as tungsten carbide. Spheres 70 are located equidistantly from the center of plates 68 and 60. However, if desired, some of the spheres 70 may be located at slightly different distances from the center of plates 68 and 69 than the remaining spheres so that some of the spheres strike the end 66 of cap 60 at different points than the other spheres. As seen in FIGS. 9 and 10, plate 90 is provided with an outer circle of spheres 91 and an inner circle of spheres 92. Both the inner and outer circles of spheres are held in place in the recesses 90a provided in the plate 90 by means of a top holding plate 93. As seen in FIG. 10 the radius of the circle A which passes through the center of the spheres 91 in the outer circle of spheres is larger than the radius of the circle B which passes through the center of the spheres 92 in the inner circle of spheres. The difference in the radii A and B of the two circles of spheres is less than the radius of the individual spheres in these two circles. This results in an overlap between the spheres in the two circles. When the edge 66 of the closure 60 is brought into contact with the spheres in the inner and outer circles, as seen in the phantom lines in FIG. 9, the inner and outer portions of the edge 66 are contacted by the circle of spheres 91 and 92 respectively. Thus both the inner and the outer portions of the edge 66 are rounded by contact with the respective circles of spheres 91 and 92. Since the two circles of spheres overlap, the edge 66 of the closure is prevented from touching the top plate 93 and thus causing damage to the edge of the closure. By rounding both the outer and the inner portions of the edge of the closure a smooth surface is produced that will not cut the hands of the user.

Metal spheres 70 are held in generally hemispherical holes 71 in plate 68 by upper plate 69 having holes 69a therein so that they can rotate and turn freely. Plate 69 can be attached to plate 68 by welding, bolting, or any conventional means. Plate 68 has a shaft 72 rigidly connected thereto which extends vertically down from the plate and is connected to a driving motor (not shown) which turns the shaft 72 and plate 68.

Closure 60 as shown in FIG. 6 is grasped by a closure holding device 74 connected to shaft 76 which may be any conventional closure holding device known in the art. Closure 60 may be force-fitted into holding device 74, or clamped, or held by any conventional means such as a vacuum or the like. Plate 68 is continuously rotating.

The closure 60 is moved over plate 68 and spheres 70 and then forced downwardly thereon as shown by the "ghosted" lines in FIG. 6. The edge 66 of closure 60 strikes the spheres 70 at a distance "Y" from the centerline 78 of the spheres 70 toward the center of late 68. Preferably, distance "Y" is approximately one-half of the radius of the spheres 70. Distance "Y" may vary from about one-fourth to about three-fourths of the radius of the spheres 70.

The rotating spheres round the edge of closure 60 and then closure 60 is removed therefrom. The rounded edge 80 of closure 60 is shown in FIGS. 8 and 8A.

In FIGS. 6 and 7 the preferred mode of the invention is shown to utilize six spheres in plate 68. However, if desired, more or less than six spheres could be used.

An insert 12 may be added before or after the closure edge 80 has been rounded in accordance with the invention for those applications requiring closures with inserts. If no insert is desired, the closure is ready for placement on the container after the edge is rounded. However, if desired, the closure can be painted, plated, or the like after the edge is rounded. Furthermore, additional shaping operations may be performed after the edge is rounded.

Althouth it is preferred that the closure remain stationary and that the table containing the spheres be rotated, if desired, the closure can be rotated and the plate containing the bearings could remain stationary.

It has been found that the closures of this invention are best made of ductile materials which are easily workable. Preferred metals are the ferrous metals. A most preferred metal is aluminum and various alloys thereof.

Although the preferred embodiments of the present invention have been disclosed and described in detail above, it should be understood that the invention is in no sense limited thereby and its scope is to be determined by that of the following claims.

What is claimed is:

1. A method for rounding the edge of a cylindrical, hollow metal closure having a closed end and an open end having a sharp outer edge portion produced by pinch trimming waste material from the open end of the closure comprising:
   a. holding the metal closure so that its open end is free;
   b. contacting only the sharp outer edge portion of the open end of the metal closure solely with a plurality of metal spheres rotatably mounted in a single circular pattern in a plate; and
   c. orbiting the metal spheres around the metal closure to roll inwardly the sharp outer edge portion of the closure to produce a smooth edge on the closure that does not protrude outwardly or inwardly.

2. The method of claim 1 including the step of contacting the spheres only with the sharp outer edge portion at a point on the spheres which lies between the vertical center line of the spheres which is perpendicular to the plate and the center line of the support plate.

3. The method of claim 1 including the step of contacting the spheres only with the sharp outer edge portion of the open end of the metal closure at points on the spheres equal to approximately one-half of the radius of the spheres.

4. An apparatus for rounding the edge of a cylindrical, hollow metal closure having an open end and a closed end comprising:
 a. means for holding the closure so that its open end is free;
 b. a one-piece cylindrical support plate having a plurality of hemispherical recesses in its face arranged in a singular circular pattern;
 c. a one-piece cylindrical retainer plate of substantially the same size as the support plate, having a plurality of opening therein arranged in a singlular circular pattern, the openings overlying the recesses in the support plate;
 d. a plurality of metal spheres received in the recesses in the support plate and projecting through the openings in the retainer plate to be rotatably retained therebetween;
 e. means to couple the support plate and the retainer plate together;
 f. means for producing relative rotation between the holding means and the support plate; and
 g. means for producing relative movement between the holding means and the support plate to bring the edge of the open end of the closure into contact with the spheres.

* * * * *